US005648884A

United States Patent [19]

Lazzari

[11] Patent Number: 5,648,884
[45] Date of Patent: Jul. 15, 1997

[54] MAGNETIC HEAD WITH AN UNDERLYING LONGITUDINAL MULTILAYER MAGNETORESISTOR

[75] Inventor: Jean-Pierre Lazzari, Coremc, France

[73] Assignees: Commissariat a L'Energie Atomique, Paris; Silmag, Grenoble Cedex, both of France

[21] Appl. No.: 517,372

[22] Filed: Aug. 21, 1995

[30] Foreign Application Priority Data

Sep. 13, 1994 [FR] France .................................. 94 10897

[51] Int. Cl.$^6$ ...................................................... G11B 5/39
[52] U.S. Cl. .................................................... 360/113
[58] Field of Search ........................................ 360/113

[56] References Cited

U.S. PATENT DOCUMENTS 5,301,079  4/1994  Cain et al. .

FOREIGN PATENT DOCUMENTS 0 475 397  3/1992  European Pat. Off. .
WO 93/08562  4/1993  WIPO .

OTHER PUBLICATIONS

IEEE Transactions on Magnetics, vol. 25, No. 5, pp. 3686–3688, Sep. 5, 1989, D.W. Chapman, "A New Approach to Making Thin Film Head–Slider Devices".

IEEE Transactions on Magnetics, vol. 25, No. 5, 3689–3691, Sep. 5, 1989, D.W. Chapman, et al., "A New, Horizontal MR Head Structure".

Patent Abstracts of Japan, vol. 8, No. 72 (p–265) [1509], Apr. 4, 1984, JP–A–58 218024, Dec. 19, 1983.

Patent Abstracts of Japan, vol. 16, No. 117 (p–1328), Mar. 24, 1992, JP–A–03 286413, Dec. 17, 1991.

Patent Abstracts of Japan, vol. 13, No. 85 (p–834) [3433] Feb. 27, 1989, JP–A–63 266619, Nov. 2, 1988.

*Primary Examiner*—A. J. Heinz
*Attorney, Agent, or Firm*—Oblon, Spivak, McClelland, Maier & Neustadt, P.C.

[57] ABSTRACT

A magnetic layer 16 adopts the shape of an insulating ridge 14 and a multilayer magnetoresistor (MR) functions in a longitudinal mode and underlies the magnetic layer. The device is used for magnetic recording and can be a read-only head or a read-write head.

5 Claims, 3 Drawing Sheets

MAGNETIC HEAD WITH AN UNDERLYING LONGITUDINAL MULTILAYER MAGNETORESISTOR

BACKGROUND OF THE INVENTION

1. Field of the Invention

The present invention relates to a magnetic head with an underlying, longitudinal multilayer magnetoresistor. It is used in magnetic recording. The head according to the invention can be a read-only head and form a sensor, or can be a read-write head.

2. Discussion of Background

The invention essentially applies to horizontal, thin film heads. Such a head is shown in FIG. 1. It is possible to see therein in section a semiconductor substrate 10, a lower pole piece 12 with a conductor winding 13, which is generally in double spiral form. An insulating ridge 14 is located on the upper portion of the head and has a flat apex and two inclined sides. It is surmounted by an upper magnetic layer 16. This layer adopts the shape of the ridge and consequently has two horizontal, lateral portions $18_1$, $18_2$, two inclined, intermediate portions $20_1$ and $20_2$ corresponding to the sides of the ridge and two horizontal, central portions $22_1$, $22_2$ covering the apex of the ridge and forming the pole pieces of the head. These pole pieces are separated by a head gap 24.

The head also has a magnetoresistant element MR passing from one end $18_1$ to the other $18_2$ of the upper magnetic layer 16. This element is in contact with the magnetic layer 16 and forms a closed magnetic circuit therewith.

A conductor element 30 traversed by a current in a direction perpendicular to the plane of the drawing serves as the polarization means.

The magnetic writing circuit formed by the upper layer 16 and the lower layer 12 is interrupted by two auxiliary gaps $26_1$, $26_2$ formed between the two magnetic layers 12, 16. In other variants, these auxiliary gaps are located elsewhere and there may only be one such gap. The aim of these gaps is to increase the reluctance of the writing circuit and favour the reading circuit comprising the magnetoresistor. Such a head is described in EP-A-475 397.

Although satisfactory in certain respects, this type of head has a disadvantage associated with the weakness of the measuring signal. The magnetic reading flux is subdivided between a first circuit constituted by the upper magnetic layer 16 and the magnetoresistor MR and a second circuit constituted by the upper magnetic layer and the lower magnetic layer, so that the flux proportion traversing the magnetoresistor remains low, despite the interruption of the second magnetic circuit.

The object of the present invention is to obviate this disadvantage.

SUMMARY OF THE INVENTION

The present invention proposes a magnetic head for which the reading flux is better coupled to the magnetoresistor and the sensitivity of the magnetoresistor is improved. This object is essentially achieved by three combined arrangements:

- the magnetoresistor is of a particular type, namely of the multilayer and no longer of the monolithic type,
- the magnetoresistor functions in the longitudinal and no longer in the transverse mode,
- finally, the magnetoresistor adopts the shape of the upper magnetic layer and is no longer horizontal, so that it is in this sense that reference can be made to an underlying magnetoresistor.

With regards to the first feature of the invention, it is known that multilayer magnetoresistant materials are constituted by a stack of magnetic layers separated by non-magnetic, metal layers.

The multilayer structures use cobalt, iron, copper, chromium, nickel, alloys of iron and nickel, silver, gold, molybdenum, ruthenium and manganese, as described in the article by H. YAMAMOTO and T. SHINJO published in "IEEE Translation Journal of Magnets in Japan", vol. 7, No. 9, September 1992, under the title "Magnetoresistance of Multilayers", pp 674–684.

With respect to the second feature of the invention, it is pointed out that a magnetoresistant element can operate in the longitudinal mode if the measuring current passing through it and the magnetic field which it detects are colinear and directed lengthwise of the element, which is the case in the invention.

A multilayer magnetoresistor used in the longitudinal mode is either of the "spin valve" or antiferromagnetic coupling type (i.e. in a zero field the magnetic layers alternately have an opposite magnetization). The invention more particularly applies to the latter magnetoresistor type.

With regards to the underlying nature of the magnetoresistor, which defines the third feature of the invention, it improves the coupling with the magnetic reading flux. This flux, produced at the head gap, is made in some way or the other to traverse the magnetoresistor.

Thus, more specifically, the present invention relates to a magnetic head comprising a magnetic layer covering an insulating ridge with a flat apex and two inclined sides, said magnetic layer having, on the apex of the ridge, two pole pieces separated by an amagnetic head gap, the head also comprising a magnetoresistant element passing from one end of the magnetic layer to the other, characterized in that the magnetoresistant element is a multilayer magnetoresistor operating in the longitudinal mode, said magnetoresistor extending beneath the entire length of the magnetic layer adopting the shape of said layer and being separated therefrom by a thin insulating layer.

DETAILED DESCRIPTION OF PREFERRED EMBODIMENTS

Figure 1:
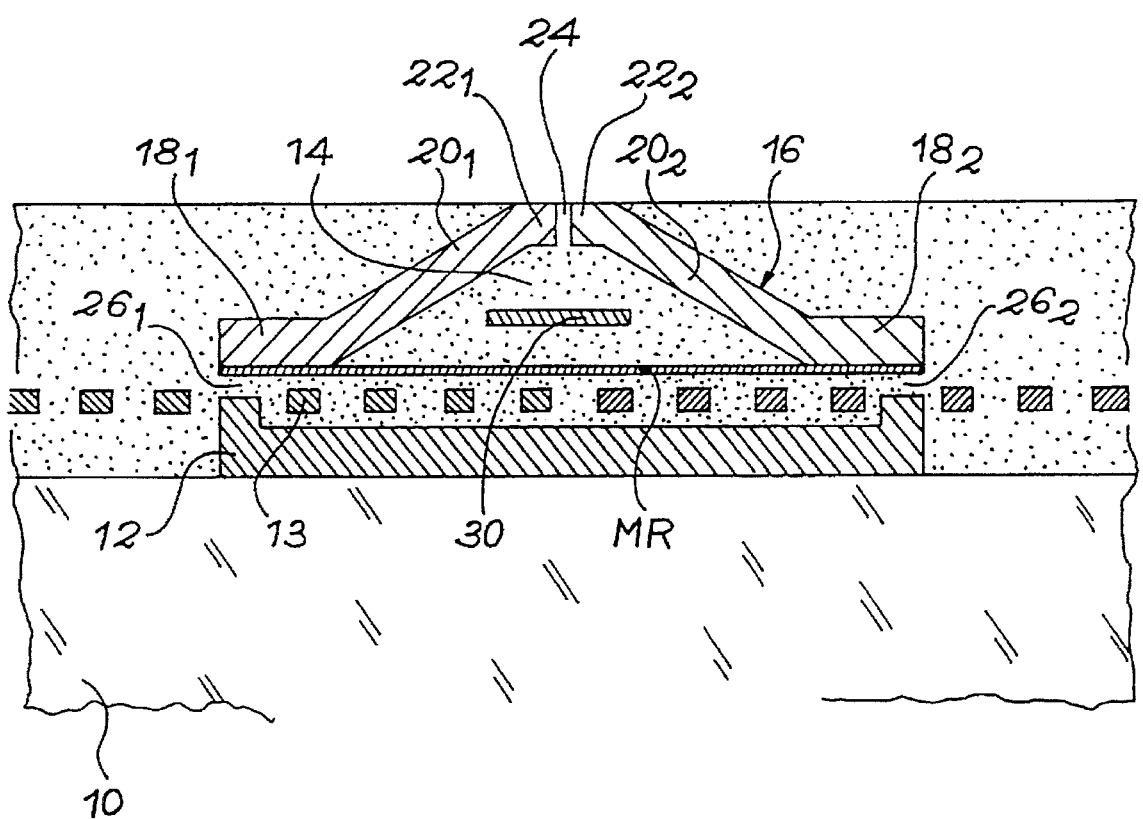
FIG. 1, already described, shows in section a prior art magnetic read head.
Figure 2:
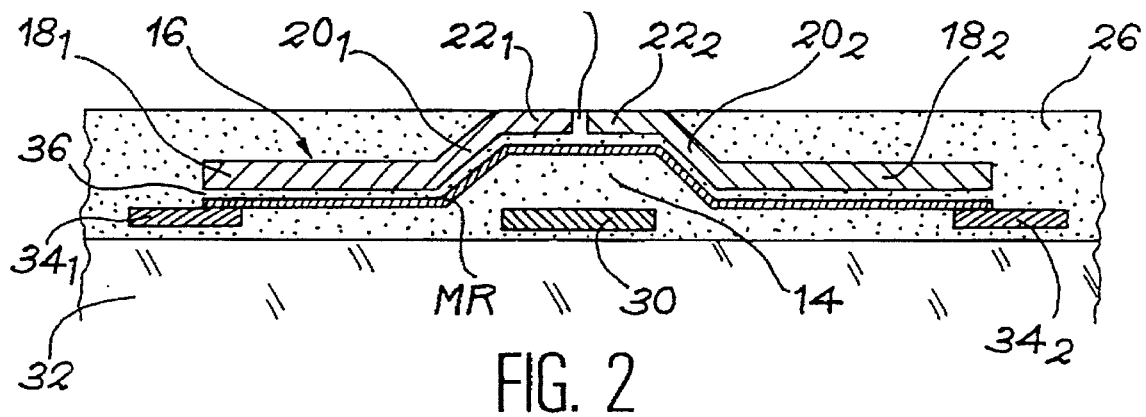
FIG. 2 shows a magnetic read head according to the invention.

FIG. 2 shows in section a magnetic read head according to the invention. In FIG. 2 it is possible to see the elements already shown in FIG. 1, namely the ridge or pin 14, the upper magnetic layer 16 formed by lateral portions $18_1$, $18_2$, inclined portions $20_1$, $20_2$ and pole pieces $22_1$, $22_2$ separated by the head gap 24.

The layer 16 can be of Fe-Ni. Its thickness can be a few micrometers, (e.g. 3 μm). Its length is that of the head and is approximately 200 μm. The magnetic layer 16 is surmounted by an insulator 26, which can be of silica and defines the movement plane of the head.

The head shown in FIG. 2 also has a magnetoresistor MR located beneath the layer 16 and separated therefrom by a thin insulating layer 36, e.g. of $SiO_2$. Thus, the magnetoresistor has two horizontal ends, two inclined portions and an upper planar portion located just below the head gap 24. The two ends of the magnetoresistor rest on two electrical contacts $34_1$, $34_2$. Therefore there is no continuous magnetic circuit formed by the layer 16 and the magnetoresistor, as described in the prior art, but only a magnetic coupling.

As the magnetoresistor MR is very long compared with its width and thickness, the demagnetizing fields will be weak.

The head shown also has an electrical conductor 30 traversed by a current perpendicular to the plane of the drawing. The magnetic field associated with this current is a longitudinal field for the magnetoresistor and ensures the operation thereof in the longitudinal mode. The assembly is placed or a substrate 32, which can be of silica or silicon.

The head described hereinbefore is used solely for reading magnetic informations, in other words it is a sensor. This device can be completed in order to make it suitable for writing informations on a support and then a read/write head is obtained.

Figure 3:
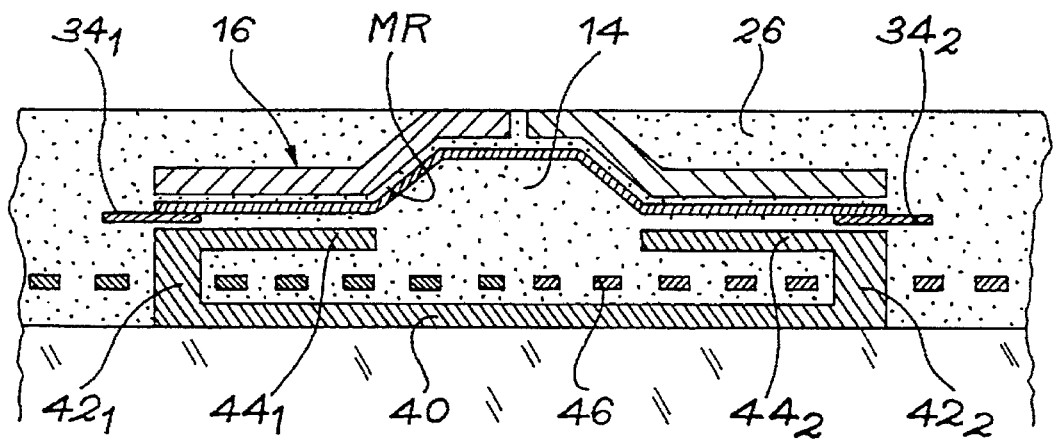
FIG. 3 shows a magnetic read/write head according to the invention.

Such a head is shown in section in FIG. 3. In FIG. 3 it is possible to see the upper magnetic layer 16, the underlying magnetoresistor MR and the contacts $34_1$ and $34_2$. There is also a lower magnetic layer 40 extended by two pillars $42_1$, $42_2$ and two flux concentrators $44_1$, $44_2$, which bear on the two pillars. A conductor winding 46 permits the passage of the writing current.

Figure 4:
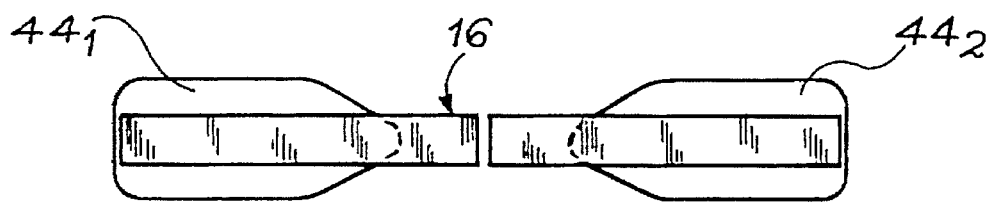
FIG. 4 shows in plan view the flux concentrators.

The two concentrators $44_1$ and $44_2$ have a thickness of a few micrometers and a length of e.g. 50 to 80 μm. Their width decreases towards the centre of the head, as shown in FIG. 4. The width drops from approximately 60 μm to approximately 10 μm. The width of the narrowed zone is equal to that of the upper magnetic layer 16.

Between the concentrators $44_1$, $44_2$ and the upper magnetic layer 16 there are two insulating gaps, which interrupt the overall magnetic circuit of the head and in said gaps are located the magnetoresistor ends.

In a read/write head, there is no need for a polarization conductor, as in a read head (conductor 30 of FIG. 2). The reason is that the winding 46 can be used as the longitudinal polarization means for the magnetoresistor as a result of the passage of a weak current. This is the case in the embodiment of FIG. 3.

Figure 5A:
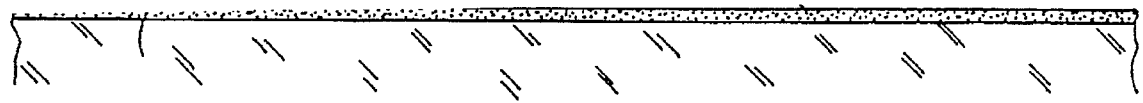
FIGS. 5A, 5B, 5C and 5D illustrate four stages of a process for producing a head according to the invention.

FIGS. 5A to 5D show four stages of a process for producing a read head according to the invention (or the upper part of a read/write head). The starting item is a substrate 50 (or a subassembly already comprising a closing circuit for the flux with its winding). On said substrate is deposited an insulating layer 52 (FIG. 5A).

Figure 5B:
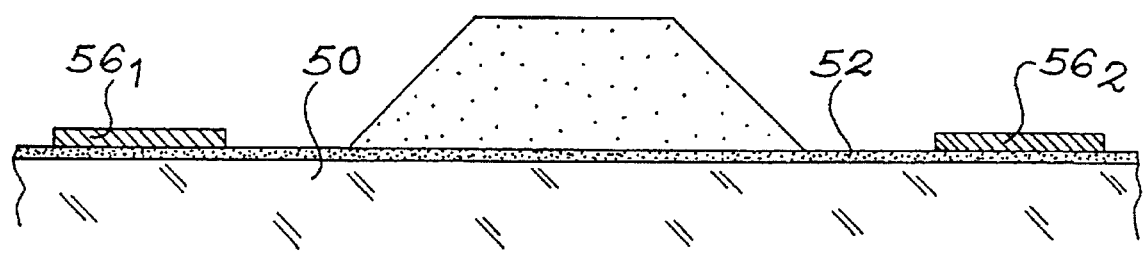

This is followed by the deposition of an insulating layer, which is surmounted by a resin mask and by etching the insulator is removed around the mask so as to only leave an insulating pin or ridge 54 beneath the mask. This is followed by the deposition of a metal layer, which is etched to obtain two end elements $56_1$, $56_2$, which will form the future contact elements (FIG. 5B).

Figure 5C:
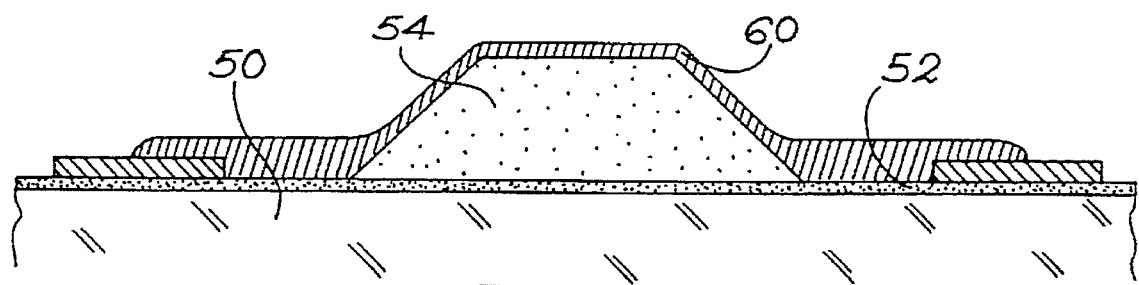

This is followed by the deposition of a multilayer magnetoresistive material layer 60, which can e.g. be of Ag/FeNi. This layer is etched to give it the desired length and width (FIG. 5C).

Figure 5D:
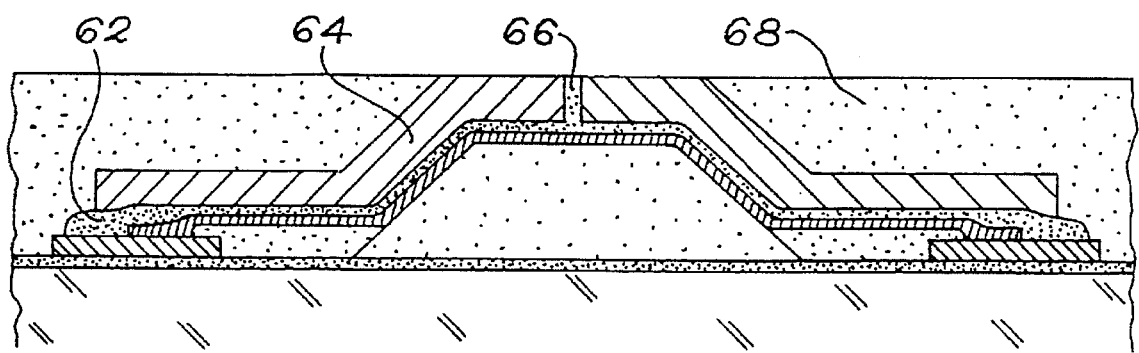

The assembly is covered with a thin insulating layer 62, e.g. of $SiO_2$ (FIG. 5D). Then, using any known process, an upper magnetic layer 64 with its head gap 66 is produced. The head is completed by an insulator 68 defining the head movement plane.

I claim:

1. A magnetic head comprising:
    an insulating portion having an insulating ridge section wherein said insulating ridge section has a flat apex and two inclined sides;
    a multilayer magnetoresistor element operating in a longitudinal mode having a magnetoresistor ridged portion which surmounts said ridge section of said insulating portion, said multi-magnetoresistive layer further comprising two flat portions, each one of said flat portions being on a respective side of said ridge portion;
    a magnetic layer covering said magnetoresistor element including two pole pieces separated by an amagnetic head gap position above said flat apex of said ridge section;
    a thin insulating layer separating said magnetoresistor element from said magnetic layer whereby said magnetoresistor element is positioned between said magnetic layer and said insulating portion.

2. The magnetic head according to claim 1 further comprising two electrical contacts each positioned at a respective end of said magnetoresistor element.

3. The magnetic head according to claim 1 further comprising a polarizing conductor positioned in said insulating ridge section for receiving current perpendicular to a length of the magnetoresistive element.

4. The magnetic head according to claim 1 further comprising a magnetic circuit for closing a magnetic flux and a conductor winding magnetically coupled to said magnetic flux whereby said head operates both for reading and writing and wherein said magnetoresistive element has ends located in said magnetic flux closing circuit.

5. The magnetic head according to claim 4, wherein said magnetic closing circuit comprises two magnetic flux concentrators.

* * * * *